Feb. 16, 1937.  J. ZARB  2,071,245
CLUTCH
Filed Nov. 2, 1933    3 Sheets-Sheet 1

INVENTOR
J. Zarb
BY
ATTORNEY

Feb. 16, 1937.                J. ZARB                2,071,245
                              CLUTCH
                       Filed Nov. 2, 1933           3 Sheets-Sheet 2
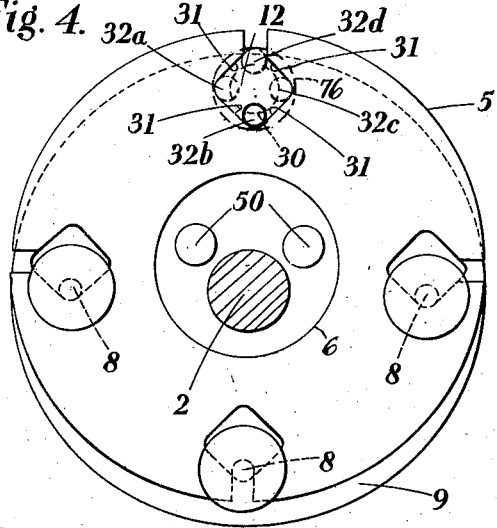
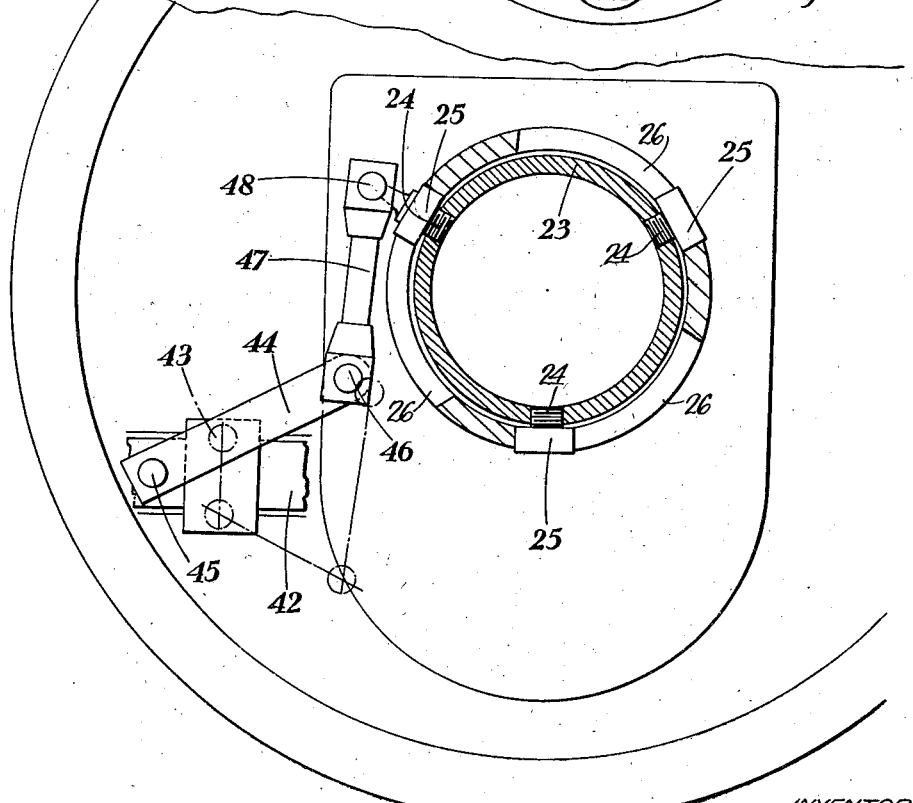
INVENTOR
J. Zarb
BY
ATTORNEY Feb. 16, 1937.   J. ZARB   2,071,245
CLUTCH
Filed Nov. 2, 1933   3 Sheets-Sheet 3
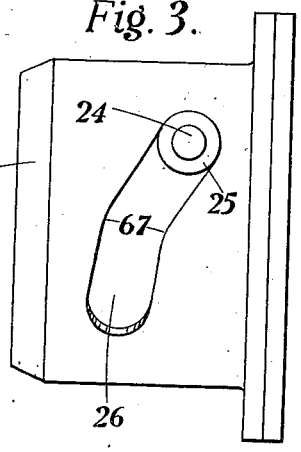
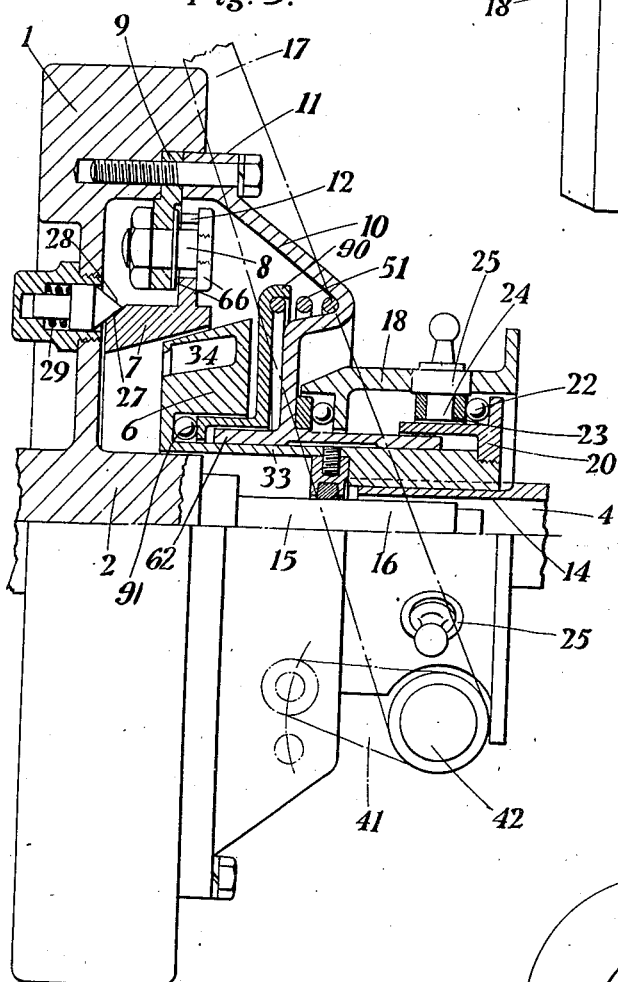
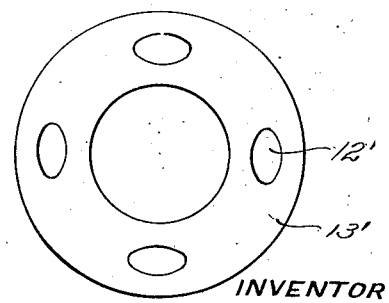
INVENTOR
J. Zarb
BY
ATTORNEY Patented Feb. 16, 1937

2,071,245

UNITED STATES PATENT OFFICE 2,071,245

CLUTCH

Joseph Zarb, London, England

Application November 2, 1933, Serial No. 696,417
In Great Britain March 14, 1933

12 Claims. (Cl. 192—66)

This invention relates to clutches for conveying rotary motion and aims at providing a clutch which is of smaller radius, in relation to the power transmitted, than is possible in the case of the usual friction clutch.

Although the present invention is generally intended to be applied to clutches which convey rotary motion to a loaded driven shaft from a driving shaft, it is also applicable to devices for retarding or decreasing rotary motion, that is to say it is applicable to brakes, and the term clutch used in this specification is to be understood to include clutches which convey rotary motion from one member to another and clutches which are used to couple rotary members to fixed members.

The principal object of the invention is to provide a mechanism for establishing connection between two members, one of which is a rotating shaft comprising a cone mounted on one member, means for permitting said cone to have a limited movement in relation to said member, a cone adapted to engage with said first mentioned cone and mounted eccentrically on the other member, and means for imparting axial movement to one of said cones.

Another object of the invention is to provide a clutch comprising a male or female cone mounted eccentrically upon one shaft and a co-operating cone mounted upon the other shaft in such a manner that it can have a limited movement in relation thereto, and thereby provide a positive drive between the two shafts. When the cones are engaged one within the other they are eccentrically disposed in relation to the axes of the rotating shafts.

With these and other objects in view the invention consists in the new or improved features, combinations and arrangements of parts embodied in the preferred form of mechanism which it is now proposed to describe by way of example with reference to the accompanying drawings.

It is to be noted that the term cone as used in this specification designates a member of frustoconical form generally termed a cone in relation to friction clutches.

Fig. 2 shows an end view of the clutch as seen from the right hand side of Fig. 1, certain parts being omitted to illustrate more clearly the clutch withdrawal device.

Fig. 3 shows, in side elevation, the withdrawal device supporting member.

Fig. 4 is a diagram illustrating the means whereby the female cone is fixed to the flywheel.

Fig. 5 is a side elevation, partly in section of a slightly modified form of construction.

Fig. 6 shows an alternative shape for the apertures formed in the flange of the member carrying the female cone.

Figure 1:
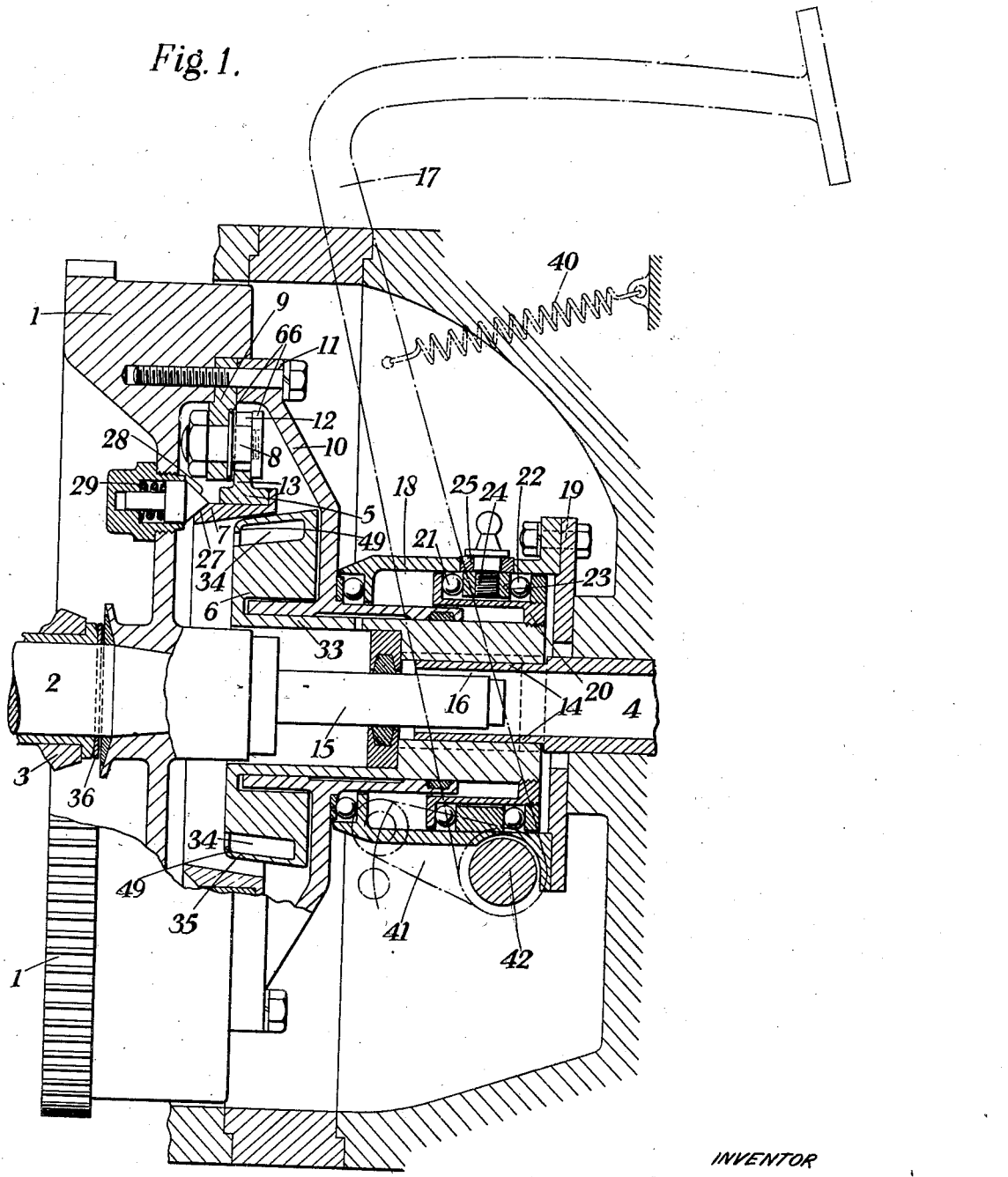
Fig. 1 shows a side elevation of the clutch partly in section.

Referring now to Fig. 1, a flywheel 1 is carried on the rearward end of the crankshaft 2 of an internal combustion engine, which is supported in a bearing 3. An annular member 9 and a casing 10 are fixed to the rearward face of the flywheel 1 by means of bolts 11. A female cone 7 is formed within an annular member 5 which is fixed to the member 9 by means of four or more pins 8 which pass through enlarged apertures 12 in a flange 13 of the annular member 5, with the result that this latter is capable of having a limited movement in relation to the flywheel 1.

A driven shaft 4, coaxial with the shaft 2 carries a male cone 6 adapted to engage with the female cone 7. The cone 6 is integral with, or fixed to a hollow cylindrical member 33 and is arranged eccentrically in relation to the common axis of the shafts 2 and 4. The cylindrical member 33 is splined upon the end of the shaft 4 as indicated by the reference number 14. A spigot 15 formed on the end of the shaft 2 is supported within a hollow portion 16 of the shaft 4.

The clutch withdrawal mechanism is operated by the foot-pressed lever 17 as is the usual practice in automobile construction. The withdrawal mechanism is supported by a cylindrical member 18 which is secured to the frame of the automobile by means of bolts 19. Another cylindrical member 20 is arranged within the support 18, and is fixed to the member 33, as shown, by being screwed thereon. As shown in Fig. 1 this member 20 carries a ring 23 mounted freely thereon and situated between two thrust bearings 21 and 22. Three or more pins 24 are fixed to the ring 23 at regular intervals and project radially therefrom, passing through slots 26 (Fig. 3) in the support 18. The sides of these slots are formed as cam surfaces 67 and rollers 25 are mounted on the pins 24 and act as cam followers.

As shown in Fig. 3 the cam surfaces 67 are formed with one portion of greater, and one of lesser inclination thereby permitting the cone 6 to be moved more quickly when disengaged from the cone 7, and more slowly when it is in contact therewith.

A lever system is provided as shown in Fig. 2, and described in greater detail hereinafter, whereby movement of the pedal 17 results in an angular movement of the ring 23. When the slots 26 are arranged as shown, a clockwise movement of the ring 23, as viewed from the right hand end of Fig. 1, will result in it being displaced to the right, and this movement is transferred to the member 20 through the thrust bearing 22, thereby moving the member 33 and also the cone 6, thus disengaging the clutch.

In order to explain the sequence of events when the clutch is engaged it is necessary first to describe in greater detail the construction and arrangement of the cones 6 and 7. The annular member 5 comprises two parts; an inner gun-metal part in which the cone 7 is formed and an outer steel flange in which the apertures 12 are formed. The pins 8, which secure the member 5 to the annular member 9, are formed with flanges 66 which are arranged to retain the member 5 but not to grip it firmly with the result that it can move freely in relation to the member 9 by an amount which is limited by the apertures 12.

One form of profile which the apertures 12 may have is shown in Fig. 4 (in which the various members are not shown to scale in order to render the following description clearer) and the considerations which lead to the adoption of this profile are as follows:—When the clutch is engaged the member 5 and its flange 13 will tend to move as the sheave of an eccentric normally moves, that is to say each point thereon tends to move in a circle, the radius of which is equal to the equivalent radius of the eccentric. This path is indicated by the broken line 30 in Fig. 4. If this motion were to be unrestrained, and there were no driving connection between the two cones, the apertures 12 would have to be of sufficiently large dimensions to permit the outer circumference of each pin to follow a path indicated by the broken line 76. Since, however, this motion must be prevented in order to give the positive drive, the apertures 12 are provided with flats 31 which prevent the pins 8 from moving to the positions 32a, b, c, d, relative to the flange 13 along the circular path (it will be appreciated that showing a number of positions 32a, b, c, d, of the pin 8 relative to the flange 13 is a convenient way of representing movement of the flange 13 relative to the pins 8.) As shown, when the pin 8 occupies any one of the positions 32a, b, c, d, its centre is on the line 30, and its outer circumference is on the line 76, and the cone 6 can then be fully engaged with the cone 7, or in other words, it is necessary to have the apertures 12 of sufficiently large dimensions in certain directions in order to allow the displacement of the flange 13 and therefore of the member 5 from the central position, required by the engagement of the cone 6 with the cone 7, that is to say, they must in certain directions, have a width at least equal to twice the equivalent radius of the eccentric plus the diameter of the pins, assuming that these latter are of circular section.

So long as they conform to the conditions set out above, the apertures may be of any shape other than circular. Fig. 6 shows, by way of example, the flange 13' provided with apertures 12' of substantial elliptical form.

It will be observed that when four pins 8 are used, each aperture 12 has four positions 32a, b, c, d, available for the pins 8, when the cones 6 and 7 are in the engaged position. If any number of pins other than four are used the shape of each aperture 12 will have to be correspondingly adapted.

In order to bring the member 5 into the central position when the clutch is disengaged, a bevelled edge 27 is formed thereon and co-operates with a number of conical wedges 28 arranged symmetrically in the flywheel. As shown in Fig. 1 each wedge 28 is urged towards the right by means of a helical spring 29.

The cone 6 has an annular slot 34 formed near its outer circumference which leaves a narrow ring 35 of metal on the outer circumference of the cone. The cross section of this ring tapers towards the forward or left hand face of the cone 6 with the exception of the rim 39 of metal which is left to strengthen the extreme edge. The actual thickness of this ring is such that its forward edge is capable of a few thousandths of an inch deformation in order to render the engagement of the clutch more smooth. The clutch runs in oil which fills the space between the casing 10 and the flywheel 1.

As shown in Fig. 1, the clutch is in the disengaged position, the member 5 is therefore central held by the wedges 28, and each pin 8 is substantially at the centre of each aperture 12. As the clutch pedal 17 moves toward engaged position the forward face of the cone 6 advances within the cone 7 until its forward edge contacts therewith. Further forward movement causes the member 5 to be displaced from the central position. Assuming that the male cone is initially stationary, the female cone is then held against rotation (if the male cone is inserted sufficiently far for its friction to overcome that of the wedges 28) during the relatively short period required for some of the pins 8 to come up against the edges of the corresponding apertures. There will now be a tendency for frictional drive between the relatively small surface areas of the two cones 6 and 7 which are in contact; if this drive occurs without slip, the relative positions of the pins 8 in the apertures 12 will remain unchanged, except insofar as they may be changed by increased eccentricity of the female cone due to axial movement of the male cone. If slip occurs while the relative axial movement between the cones is arrested (the clutch pedal 17 being maintained in an intermediate position) the pins 8 will move relatively to the apertures (due to the movement of the female cone 7 which has been compared above to the movement of the sheave of an eccentric) and their paths relatively to the corresponding apertures will be circles, the radii of which are equal to the eccentricity of the female cone and hence dependent upon the distance which the male cone has moved into it.

As the clutch pedal moves further towards engaged position and the male cone advances into the female cone, larger surfaces of the two cones come into contact with increase of driving area. If slip occurs while there is uniform relative axial movement between the cones, the relative paths of the pins within the apertures will be compounded from circles of progressively increasing radius and will thus be spirals.

The drive remains frictional until the male cone has advanced so far that the eccentricity of the female cone plus the diameter of the pins (and hence the outer limits of the relative paths which opposing points on the outer circumferences of the pins 8 would follow in the aperture if slip were possible) is greater than the radius of the inscribed circle of the non-circular apertures; when this point has been reached the cones are definitely locked against slipping and the drive is positive and dependent upon the combined shearing strength of such of the pins 8 as are actually in a position to transmit drive to the female cone 7 by contact with the sides of the apertures. In the final fully engaged position of the clutch, the pins 8 are forced into one of the four positions 32a, 32b, 32c or 32d according to the relative direction of eccentricity. When diamond-shaped apertures are used, any three of these pins 8 may be engaged in transmitting the drive at one time.

It is preferable to have the angle of the cones 6 and 7 below 10°, since there is then little or no reaction tending to disengage the clutch, and it is sufficient to provide only a helical return spring 40 on the pedal 17. Any axial thrust caused by the action of the spring 40 is taken up by the thrust bearing 36.

The means used to connect the pedal 17 with the ring 23 are shown in Figs. 1 and 2. An extension 41, fixed to the lower end of the pedal, which is supported on the fixed pivot 42 has ball and socket connection 43 with a link 44 which is carried by a fixed pivot 45 at one end and has an articulated connection 46 with another link 47, at its other end. This link 47 has a ball and socket connection 48, with one of the pins 24.

In order to balance the mechanism the eccentric cone 6 is bored as at 50 (Fig. 4). The modified construction shown in Fig. 5 is identical with that shown in Fig. 1 with the exception of the provision of a helical spring 51 which abuts against a member 90; this latter transmits the pressure of the spring to the cone 6 through a thrust bearing 91, the effect is thus normally to urge the clutch into the engaged position, as in the usual automobile clutch practice.

The particular form of construction illustrated is such that no thrust can be set up by the clutch which will tend to force the driving and driven shafts out of centre. This is effected by having a cylindrical extension 62 of the casing 10 formed to act as a bearing for the cylindrical member 33 carrying the cone 6, then any thrust set up on one side of the annular member 9 is balanced by an equal and opposite thrust on the other side, which is transmitted by the casing 10.

I claim:—

1. A mechanism for establishing a connection between two members, one of which is a rotating shaft, comprising a cone mounted on one member, a plurality of pins fixed in relation to said member, a member having a plurality of non-circular apertures fixed to said cone, said pins engaging within said apertures and having limited movement in relation thereto in all directions normal to the axis of said cone, a cone adapted to engage with said first mentioned cone and mounted eccentrically on the other member, and means for imparting axial movement to one of said cones.

2. A clutch for conveying rotary motion from a driving shaft to another co-axial driven shaft comprising a member fixed to said driving shaft and extending radially therefrom, a plurality of pins fixed to said member, a female cone, a member having a plurality of non-circular apertures fixed to said cone, said pins engaging within said apertures and having a limited movement in relation thereto, a male cone mounted eccentrically upon said driven shaft and means for imparting axial movement to said male cone.

3. A clutch for conveying rotary motion from a driving shaft to another co-axial driven shaft comprising a female cone carried by said driving shaft, means for permitting said cone to have a limited movement in relation to said driving shaft, a male cone splined eccentrically upon said driven shaft, a member capable of rotation in relation to said male cone, but incapable of axial movement in relation thereto, a plurality of cam followers fixed to said member, a fixed member having a plurality of cam surfaces formed thereon and arranged to co-operate with said cam followers, and means for imparting an angular movement to said first mentioned member.

4. A clutch for conveying rotary motion from a driving shaft to another co-axial driven shaft comprising a female cone carried by said driving shaft, means for permitting said cone to have a limited movement in relation to said shaft in all directions normal to the axis thereof, a male cone adapted to engage with said female cone and mounted eccentrically upon said driven shaft and having a flexible portion to first engage with said female cone, and means for imparting an axial movement to said male cone.

5. A clutch for conveying rotary motion from a driving shaft to another co-axial driven shaft comprising a plurality of pins fixed in relation to said driving shaft, a female cone, a member fixed to said female cone and having a plurality of enlarged apertures, said pins engaging within said apertures which allow each pin to occupy a number of positions therein at least equal to the total number of pins, each of said positions being on the path that each point of the member would have if executing the movement of the sheave of an eccentric in relation to said pins, a male cone mounted eccentrically upon said driven shaft, and means for imparting an axial movement to said male cone.

6. A clutch for conveying rotary motion from a driving shaft to another co-axial driven shaft comprising a member fixed to said driving shaft and extending radially therefrom, a female cone carried by said member, means for permitting said cone to have a limited movement in relation to said member, a male cone adapted to engage with said female cone and splined eccentrically upon said driven shaft, a casing mounted rotatably on said driven shaft on the opposite side of said male cone to said driving shaft, enclosing said male and female cones, and fixed to said radially extending member.

7. A clutch for conveying rotary motion from a driving shaft to another co-axial driven shaft comprising a female cone fixed to said driving shaft, a male cone adapted to engage with said female cone, means for imparting an axial movement to said male cone, means for permitting said female cone to move in any direction normal to the common axis of said shafts to move to a position in which it is in eccentric relationship with the common axis of said shafts, and means for moving said female cone into a substantially concentric relationship with said common axis of the shafts.

8. A clutch for conveying rotary motion from a driving shaft to another co-axial driven shaft comprising a cone carried by one of said shafts, means for permitting said cone to move in any direction normal to the axis of said shaft to occupy a position in which it is eccentrically disposed in relation to said shaft, means to move said cone into a substantially concentric relationship with said shaft, a second cone, adapted to engage with said first mentioned cone and mounted eccentrically upon the other one of said shafts, and means for imparting an axial movement to one of said cones.

9. A clutch for conveying rotary motion from a driving shaft to another co-axial driven shaft comprising a member fixed to said driving shaft and extending radially therefrom, a female cone carried by said radially extending member and having a lost-motion connection therewith, a member fixed in relation to said female cone and having an annular bevel formed thereon, a plurality of spring-pressed conical wedges carried by said radially extending member, and adapted to co-operate with said annular bevel of said member fixed to said female cone, a male cone adapted to engage with said female cone and mounted eccentrically upon said driven shaft, and means for imparting an axial movement to one of said cones.

10. A clutch for conveying rotary motion at first frictionally and finally positively from a driving shaft to another co-axial driven shaft comprising a female cone carried by said driving shaft, means for permitting said cone to have limited movement in relation to said shaft in all directions normal to the axis thereof, a male cone splined eccentrically upon said driven shaft, and means for imparting axial movement to said male cone.

11. A clutch for conveying rotary motion at first frictionally and finally positively from a driving shaft to another co-axial driven shaft comprising a female cone mounted on said driving shaft, means for permitting said cone to have a limited transverse movement in relation to said shaft in all directions normal to the axis thereof, a male cone splined eccentrically upon said driven shaft and adapted to engage with said female cone, a control lever for moving said male and female cones into and out of engagement, and a spring adapted to maintain said male and female cones in engagement.

12. A clutch for conveying rotary motion at first frictionally and finally positively from one shaft to another co-axial shaft in which a female cone is fixed to the driving shaft in such a manner that it has limited movement in relation thereto in all directions normal to the axis thereof, and a male cone is splined, or similarly mounted eccentrically upon the driven shaft.

JOSEPH ZARB.